Figure 1:
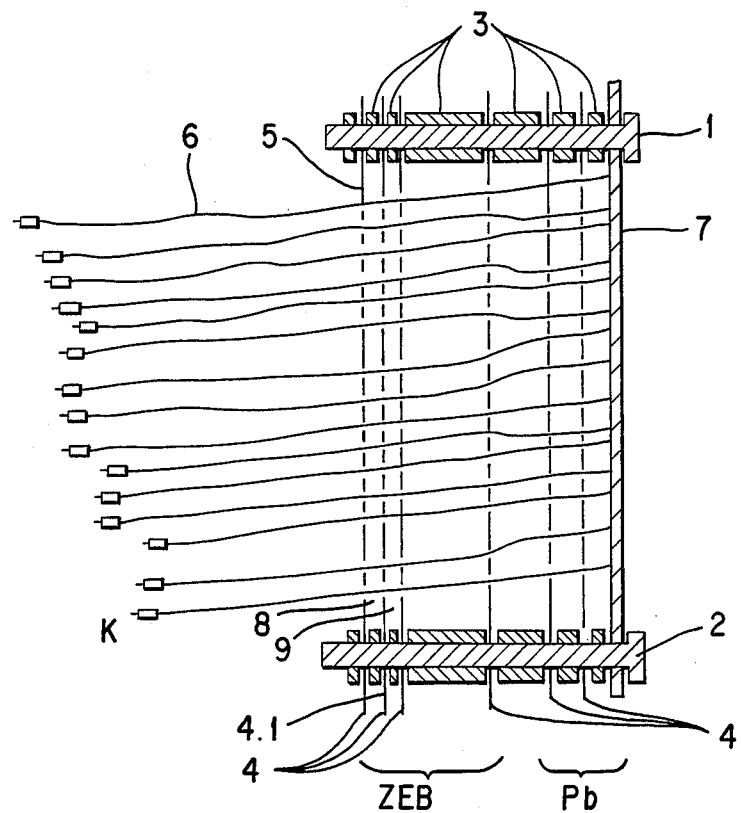

United States Patent

Mohr et al.

[11] Patent Number: 4,759,598
[45] Date of Patent: Jul. 26, 1988

[54] APPARATUS FOR THE POSITIONING OF ENDS OF FLEXIBLE LIGHT-CONDUCTING ELEMENTS

[75] Inventors: Joachim Mohr, Jena; Helmut Becker-Ross, Berlin; Karl Brueckner, Jena; Hans Fischer, Jena-Lobeda; Guenther Moebius, Jena; Winfried Quillfeldt, Jena-Lobeda, all of German Democratic Rep.

[73] Assignee: Jenoptik Jena G.m.b.H., Jena, German Democratic Rep.

[21] Appl. No.: 934,041

[22] Filed: Nov. 24, 1986

[30] Foreign Application Priority Data

Dec. 2, 1985 [DD] German Democratic Rep. .................................... 2834981

[51] Int. Cl.$^4$ ............................................... G02B 6/24
[52] U.S. Cl. .................................................. 350/96.20
[58] Field of Search ............... 350/96.15, 96.16, 96.20, 350/96.21, 96.22

[56] References Cited

U.S. PATENT DOCUMENTS

| | | | |
|---|---|---|---|
| 3,941,785 | 3/1976 | Madden | 350/96.2 X |
| 4,319,951 | 3/1982 | Korbelak et al. | 350/96.22 X |
| 4,502,754 | 3/1985 | Kawa | 350/96.2 |

Primary Examiner—Eugene R. LaRoche
Assistant Examiner—Steven J. Mottola
Attorney, Agent, or Firm—Jordan and Hamburg

[57] ABSTRACT

An apparatus for the positioning of ends of flexible light-conducting elements with the object of attaining a high position reproducibility of the fiber ends in an effective large-scale production technique, having the object of developing a technical solution so that it can be manufactured with a production technology in accordance with the accuracy requirements, so that a multitude of light-conducting fibers having defined positions are exactly fixedly correlated to defined positions. According to the invention, there are provided to one another essentially parallel thin surface elements which are secured at a distance and form an element package which is divided into two adjacent areas and within each one of the two areas there is provided at least an approximately equal distribution of pierced openings for the light-conducting elements.

6 Claims, 1 Drawing Sheet

APPARATUS FOR THE POSITIONING OF ENDS OF FLEXIBLE LIGHT-CONDUCTING ELEMENTS

The invention is directed to the provision of an apparatus for positioning the ends of flexible light-conducting elements, which can be used when radiation portions passing through light exit openings are to be propagated separately from one another. It is especially suitable for the propagation of spectrally split light from the focal plane of a dispersing optical system to receivers.

Instruments for the multi-element-(emission-)analysis, in addition to an emission radiation source, imaging optics, a dispersing system and detection electronics, consist of an optical system for propagating the spectrally split radiation portions from the dispersing system to the receivers. The propagation of the spectral portions selected by means of exit slits occurs by mirrors or light-conducting fibers.

A technical solution described in DD-WP 217 626 using light-conducting fibers as light-conducting elements has proven in its principal concept well suited for solving a multitude of analytical problems.

Spectral lines which have to be identified are selectable in a great variety. Measuring programs for this purpose can be designed as desired, without requiring changes in the focal plane, in particular, a change of the slit mask. At the location of the focal surface there is provided a fixed body with an end face configured in accordance with the focal surface, a so-called multi-element block, for the preselection of spectral elements, in which block, in bores at the locations of the spectral elements under consideration, light-conducting fibers are glued at one of their ends. A freely selectable correlation to receivers occurs at the other ends of the fibers.

The disadvantage of this technical solution is that a reproducible positioning of the location of the glued fiber ends is not assured to a sufficient extent. Furthermore, drilling as a mechanical operating procedure in the required diameter ranges requires high technical sophistication and expense, especially because in order to assure a perpendicular incidence of radiation onto the ends of the fibers, generally the bores do not extend perpendicularly to the frontal surface of the multi-element block.

Another disadvantage is that it is difficult to realize effectively in large-scale technology the gluing of a great number of light-conducting fibers into a specified narrowly limited space.

It is therefore the object of the invention to ensure a high position reproducibility of the fiber ends in an effective large-scale technological production.

The object of the invention is to develop a technical solution such that it can be manufactured with a production technology in accordance with the accuracy requirements, so that a multitude of light-conducting fibers each having a defined position can be exactly fixedly correlated to defined positions. According to the invention, the object is solved by providing an arrangement for the positioning of ends of flexible light-conducting elements which are guided by their sections adjacent to their ends through a block and are fastened in the block. In accordance with the invention, two substantially parallel fixed spaced apart thin surface elements form an element package which is divided into two adjoining areas, a positioning area and an area for releasing the tension stress. Within each of the two areas there is provided at least an approximately equal distribution of pierced openings for the light-conducting elements.

The light-conducting elements are guided through the pierced openings which are arranged in accordance with a distribution of radiation to be imaged and the light-conducting elements are secured in the area for releasing the tension stress which is provided with an essentially equidistant arrangement of pierced openings. Advantageously, a slit mask is coupled to the positioning area, through which slit mask the distribution of radiation to be imaged passes. The sizes of the area of the openings of the slit mask correspond at a maximum to the cross-section of the correlated light-conducting core of the element. In order to fasten the light-conducting elements, the area for releasing the tension stress contains in particular a group of three closely adjacent surface elements of which the one located in the center with respect to the adjacent elements, is clamped in a position perpendicularly offset to the axes of the light-conducting elements.

Alternatively or additionally, spaces between the surface elements of the area for releasing the tension stress are filled with a hardenable material.

The surface elements of the element package extend at a skewed angle to the fiber axes in order to assure a perpendicular alignment of the fiber ends to the incident ray.

According to the invention, the configuration of the block in the form of the thin surface elements and the division of the functions "positioning" and "releasing of the tension stress" make it possible to produce the individual elements optogalvanically or optochemically, whereby the required precision in the correlation of the ends of the light-conducting elements to the existing distribution of radiation to be imaged is assured.

Figure 2:
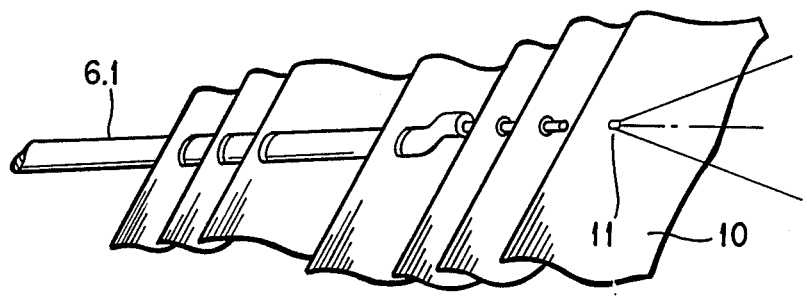

The invention will now be explained in greater detail with reference to the schematic drawings which show:

FIG. 1 a cross section of the apparatus according to the invention,

FIG. 2 a perspective view of a portion of the apparatus of FIG. 1 showing the guidance of a light-conducting element through the surface elements.

In FIG. 1, on guide bolts 1, 2, between the spacing pieces 3, there are held secured surface elements 4 which form an element package which is divided into a positioning area Pb and an area ZEB for releasing the tension stress. The surface elements 4 are thin pieces of sheet metal or foil into which pierced openings 5 are worked galvano-optically by means of photolighographically produced tools, or pierced openings 5 are worked by the spray-etching method so that reproducible positions and diameters of the pierced openings 5 can be produced with sufficient precision.

Flexible light-conducting elements formed as light-conducting fibers 6 are guided through the pierced openings 5 of the surface elements 4 and contact a removable impact plate 7. Whereas in the positioning area Pb there occurs only a lateral guidance of the light-conducting fibers 5, the latter are fixedly secured in the area ZEB for releasing the tension stress. This securing is produced by clamping. Thus, one of the surface elements 4.1, which has the same distribution of pierced opening 5 as the two adjacent ones, is secured in a position perpendicularly offset in relation to the fiber axes on the guide bolts 1, 2 and, thus, a shearing force acts upon the light-conducting fibers 6.

As an alternative of a simultaneous securing measure, the spaces 8, 9 adjacent to the surface elements 4.1 are filled with a hardenable material, such as a cast resin or the like.

In order to ensure the perpendicular incidence of radiation onto the fiber ends, the surface elements 4 are selectively staggered with respect to one another to laterally guide the fiber ends for the alignment of the fibers. This does not result, however, in the fixed fastening of the fibers. The surface elements 4, therefore, extend at a skewed angle to the fiber axes.

When all light-conducting fibers 6 have been pushed through the surface elements 4 all the way to the impact plate 7 and have been secured, the impact plate 7 can be removed. As shown in FIG. 2 for the fiber 6.1, the adjustment and coupling of the entire element package to a slit mask 10 which is arranged in the focal plane of a dispersing system which is not illustrated, occurs in such a way that the ends of the light-conducting fibers 6 are arranged at a distance of a few tenths of millimeters coaxially behind the assigned exit slits 11 of which the size of cross-section corresponds at a maximum to that of the correlated light-conducting element core. As a result the pierced openings 5 in the positioning area Pb have the same coordinates as the exit slit 11. Advantageously, in the area ZEB for releasing the tension stress the distribution of the pierced openings 5 makes a transition into an equidistant distribution.

Advantageously, such light-conducting fibers are used which have a small numerical aperture and matched wavelength-wise transmission performance. It is therewith possible to influence precisely the evaluation of the radiation exiting from the dispersing optical system via the slit mask 10 and its transmission.

It is also possible to couple an element package both to the slit mask 10 and to a receiver distribution which is not shown, wherein the distribution of the pierced openings of the element package on the slit mask 10 and the exit slit 11 and on the receiver distribution correspond to that of the receiver. Both element packages are correspondingly coupled by light-conducting fibers.

We claim:

1. In an apparatus for positioning the ends of flexible light-conducting elements which are guided by and fastened in a block by sections adjacent to their ends, the improvement wherein the block is comprised of substantially parallel thin spaced apart surface elements which are fixedly held in the block and form an element package which is subdivided into a positioning area and an adjacent area for releasing tension stress in the light-conducting elements, each of the two areas having at least an approximately equal distribution of pierced openings for the light-conducting elements.

2. Apparatus according to claim 1, wherein the light-conducting elements are guided in the positioning area through pierced openings arranged in accordance with a distribution of radiation to be imaged and are secured in the area for releasing the tension stress which is provided with an essentially equidistant arrangement of the pierced openings.

3. Apparatus according to claim 2, wherein the light-conducting elements have light-conducting element cores and a slit mask is coupled to the positioning area, the distribution of radiation to be imaged passing through the slit mask, the openings of the slit mask having sizes corresponding at a maximum to the cross-section of the correlated light-conducting element cores.

4. Apparatus according to claim 3, wherein the light-conducting elements have axes and the area for releasing the tension stress comprises a group of three closely adjacent surface elements, of which the one in the center is fixed in a position with its pierced openings offset with respect to the openings of the adjacent surface elements and is clamped perpendicularly to the axes of the light-conducting elements.

5. Apparatus according to claim 3, wherein spaces occur between the surface elements of the area for releasing the tension stress and these spaces are filled-in with a hardenable material.

6. Apparatus accordidng to claim 5, wherein the light-conducting elements have axes and the surface elements of the element package extend at a skewed angle to the axes of the light-conducting elements.

* * * * *